Oct. 27, 1970  D. J. L. GRIFFITHS  3,536,561
METHOD OF MAKING CORRUGATED PAPERBOARD
Filed July 28, 1967  2 Sheets-Sheet 1
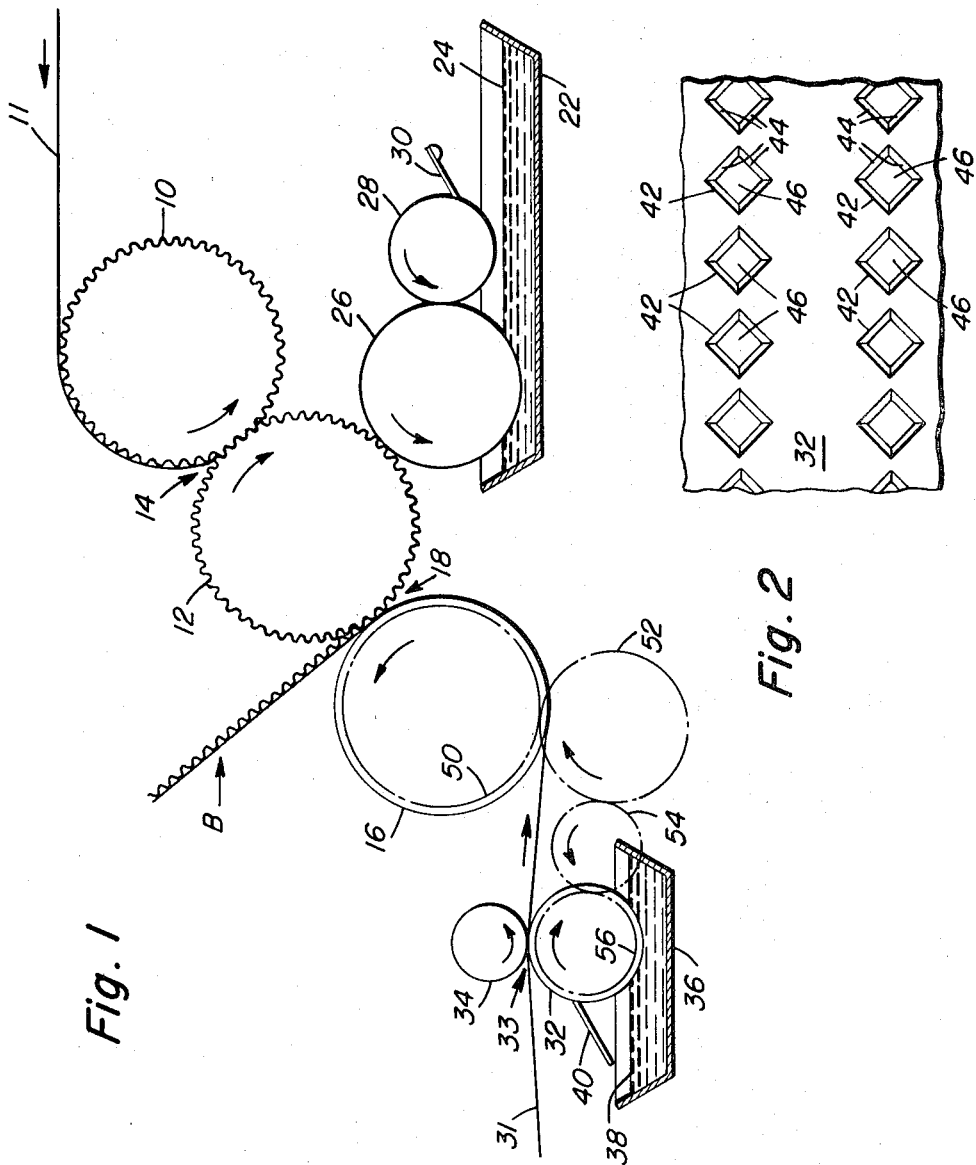
INVENTOR
Darrell J. L. Griffiths
BY Richard L. Schmalz
ATTORNEY Oct. 27, 1970     D. J. L. GRIFFITHS     3,536,561
METHOD OF MAKING CORRUGATED PAPERBOARD
Filed July 28, 1967     2 Sheets-Sheet 2

INVENTOR
*Darrell J. L. Griffiths*

BY *Richard L. Schmalz*
ATTORNEY

United States Patent Office 3,536,561
Patented Oct. 27, 1970

3,536,561
METHOD OF MAKING CORRUGATED
PAPERBOARD
Darrell J. L. Griffiths, Silver Spring, Md., assignor to Westvaco Corporation, New York, N.Y., a corporation of Delaware
Filed July 28, 1967, Ser. No. 656,894
Int. Cl. B31f 1/22
U.S. Cl. 156—205    14 Claims

ABSTRACT OF THE DISCLOSURE

A corrugated medium, having a first adhesive component applied in substantially continuous lines to the peaks of the flutes thereof, and a liner, having thereon a second adhesive component which is reactive with said first adhesive component to form a corrugating adhesive, are brought together with the second adhesive component on the liner contacting the first adhesive component on the peaks of the flutes of the corrugated medium to effect bonding between the flute peaks and liner.

BRIEF SUMMARY OF THE INVENTION

This invention relates to improvements in corrugating operations and more particularly to improved methods of bonding the various board materials which comprise corrugated paperboard. The improvements are concerned with adhesive application at the single facer, i.e., where a first liner and corrugated medium are bonded together, and at the double backer where the exposed flute tips of the corrugated medium are bonded to a second liner.

Traditionally, the singel facer comprises two meshing corrugating rolls and a pressure roll. The corrugating rolls are generally heated to surface temperatures between about 320 to 360° F. The meshing corrugating rolls form the corrugations on the corrugated medium as the medium passes between the rolls. At a nip formed by one of the corrugating rolls and a pressure roll, the liner and the corrugated medium are combined to form single faced board. Generally, a corrugating adhesive is applied to the peaks of the flutes of the corrugated medium before the latter is brought together with the liner in order to adhere the corrugated medium to the liner.

For many years, sodium silicate was about the only corrugating adhesive used for making corrugated paperboard. One objection to its use is the formation of hard, glassy deposits on the machine. Another is that silicate does not produce a water-resistant bond which is often needed to produce board used in packaging wet articles or used in damp environments. Starch, because it sets faster than silicate adhesives, has also been used for some time in the corrugating industry to bond the liner to the corrugated medium. By use of temperatures at the corrugator high enough to gel uncooked starch in the adhesive formulation, a physical, in situ bonding of the liner and medium is accomplished. Like silicate, the bonds obtained with starch are not water-resistant. For this reason, resins have been used with starch to waterproof or weatherproof the starch adhesive, but in these formulations, starch has continued by far to be the major ingredient proportionally. The performance of waterproof starch-resin adhesives has been unreliable. Under ideal conditions, the bond quality has not measured up to present standards for rigid when wet corrugated container board which require the waterproof adhesive to consistently give fiber tearing bonds after 24 hours cold water immersion of the board.

The corrugating industry has been attempting to develop fast-setting adhesives for use in bonding the liner to the corrugated medium. As the speed of the set of the adhesive increases, generally speaking, the speed of the corrugating machines increases. One attempt to obtain fast-setting corrugating adhesives has been to use thermoplastic lattices, such as polyvinyl acetate, in place of the conventional silicate and starch adhesives. Because of the high cost of these resin systems, silicate and starch adhesives are still used in most instances. Further, while the use of such resins provides a high degree of water resistance not found with the in situ starch adhesives, the lack of immediate adhesion between the liner and corrugated medium has been a problem.

The present invention concerns a new approach to the bonding of the liner to the corrugated medium. My approach is to employ an adhesive system which comprises at least two components or constituents which are separately applied in the corrugating operation. The adhesive components by themselves do not form a suitable corrugating adhesive but together they are reactive to produce an excellent corrugating adhesive. My approach includes the use of adhesive base materials such as resinous materials which can be instantaneously cross-linked, gelled, cured or set by the addition of a chemical reagent which can be defined as a curing agent, catalyst, gelling agent, hardener, or precipitating material, all of which are referred to broadly throughout this specification as "curing agents." This approach utilizes a separate application of the adhesive base to one board material and a separate application of the catalyst to another board material, and then the two board materials are combined to effect a bonding between them. The separate applications of resin and catalyst have advantages over the direct addition of the catalyst to the resin in the glue pan of the corrugator. For example, if sufficient catalyst is added to the resin at the glue pan to give a suitably rapid rate of cure, the resin has a tendency to gel or prematurely thicken, resulting in a short pot life. If insufficient catalyst is added to the resin, then gelling or curing is too slow and there is not sufficient bonding at normal corrugating operating speeds. By separate applications of resin and catalyst, these problems are obviated.

The resin may be applied in a continuous line to the peak of each flute of the corrugated medium or it may be applied to the liner. Likewise, the catalyst or curing agent may be applied to the liner or to the flute tips of the corrugated medium. For example, the resin can be applied to the peaks of the flutes of the corrugated medium in a substantially continuous line throughout the length of each flute by the conventional corrugator glue roll. In this case, the catalyst can be applied to the liner before the liner and corrugated medium are combined. Application of the catalyst to the liner requires an additional application apparatus in combination with the conventional corrugator adhesive applying devices. The additional application can be accomplished by any convenient method or apparatus such as by spraying, applicator roll, gravure roll, or printed on the liner transversely by a line printing apparatus. If a line printer is used, the catalyst (or adhesive base material as the case may be) is applied to the liner in narrow, cross-machine lines that are separated a distance equal to the distance between the peaks of the flutes of the corrugated medium. The preferred apparatus for line printing catalyst or adhesive to the liner is that described in U.S. Pat. 3,300,-359. In that patent, the patentee describes the liner printing of conventional starch adhesive on the liner in lines which register with the flue tips of the corrugated medium, in order to eliminate the know glue pan and roll of a single facer. The separate application technique of the present invention was not contemplated in the above-mentioned patent nor was the use of a line printing device suggested as an addition to a conventional corrugating machine.

Many resin-catalyst systems, heretofore unknown in the corrugating industry as corrugating adhesives, may be employed in the present invention. For example, resins such as urea-formaldehyde, polyethylene imine, polyvinyl-alcohol, resorcinol-formaldehyde, phenolic, melamine-formaldehyde, and epoxy resins may be used. As reaction promoters, i.e., catalysts, hardeners, gelling agents, accelerators, precipitating or curing agents therefor, acidic reagents such as mineral acids like hydrochloric, sulfuric, nitric, and phosphoric, and organic acids like chloroacetic, oxalic, acetic, and formic acids and aqueous solutions of acidic salts like ammonium nitrate, chloride, and sulfate may be used to cure the urea-formaldehyde resins. Aldehydes, such as glyoxal, may be used to react with and gel polyethylene imine. Solutions of borax can be used to gel polyvinyl alcohol. For resorcinol-formaldehyde resins, catalysts such as additional formaldehyde or paraformaldehyde under alkaline conditions can be used to set the resin. As previously stated, the resin can be applied in substantially continuous lines to the flute peaks of the corrugated medium by the conventional glue roll and the curing agent can be applied to the liner, or the resin may be applied to the liner and the curing agent to the flute tips. The resin or curing agent can be applied to the liner as a continuous film or placed on the liner in substantially continuous, transverse lines which register with the flute tips when the liner and corrugated medium are combined.

The preferred adhesive systems for use at the single facer or double backer are those which provide waterproof bonds. Therefore, the resin-catalyst systems described above are preferred, but the principle of the separate applications of constituents of a corrugating adhesive is not limited thereto, as will be readily appreciated by one skilled in the corrugating art.

BRIEF DESCRIPTION OF THE DRAWING

FIG. 1 is a schematic elevational view of a single facer corrugating machine which can be used to practice the present invention.

FIG. 2 is an enlarged fragmentary view of the surface of the preferred applicator roll for applying resin or curing agent to the liner.

DETAILED DESCRIPTION

Figure 3:
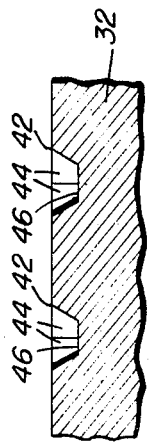
FIG. 3 is an elevational view of the applicator roll of FIG. 2.

With reference to FIG. 1, it is seen that the single facer corrugating machine contains a pair of corrugating rolls 10 and 12 which mesh in nip 14. These rolls are generally heated to surface temperatures between about 320 to 360° F. A pressure roll 16 bears against corrugating roll 12 and forms nip 18 therewith. The corrugating rolls 10 and 12 and pressure roll 16 are drivingly connected and are driven in the directions indicated by any suitable drive means (not shown). A web of corrugating medium 11 passes partially around corrugating roll 10 into and through nip 14 and is corrugated. The corrugated medium travels with the circumference of the corrugating roll 12 and fluffs out from the roll 12, the fluff out being controlled in known manner.

At a first application station, glue pan 22 contains a continuous supply of a first corrugating adhesive component, such as a resin material 24, in liquid form. Glue roll 26 rotates in glue pan 22, picking up the resin as the roll rotates toward corrugating roll 12. Doctor roll 28 meters excess resin from the glue roll 26 and the excess is removed from doctor roll 28 by blade 30 and is returned to glue pan 22. The resinous material remaining on glue roll 26 is carried towards corrugating roll 12 and is transferred to the peaks of the flutes of the corrugated medium in a substantially continuous line along the length of each of the flute peaks. In combination with the above described apparatus is a second application station where a second component for a corrugating adhesive, such as a curing agent, can be applied to the liner 31. En route to pressure roll 16, a web of a liner 31 passes through the nip 33 formed by gravure applicator roll 32 and backing roll 34. Applicator roll 32 rotates in supply pan 36 which contains a continuous supply of curing agent 38 in liquid form. Excess curing agent picked up by roll 32 is metered from the roll by blade 40. Curing agent on the roll 32 is transferred to liner 31 as a continuous film on the liner which then passes around pressure roll 16 and is combined with the corrugated medium 11 in nip 18. The curing agent on the liner contacts and reacts with the resin on the flute tips of the corrugated medium to chemically set the resin and bond the liner all across its width to the corrugated medium. The resulting board B, comprising liner 31 adhered to corrugated medium 11, is known as single faced board. As noted earlier, the resin can be applied by applicator roll 32 to the liner and the curing agent applied by glue roll 26 to the flute tips of the corrugated medium, as an alternative to the separate applications just described.

As described above, applicator roll 32 is a gravure roll of known construction. However, in the preferred embodiment of the invention, applicator roll 32 has a surface which will be described in connection with FIGS. 2 and 3. The surface of roll 32 preferably is hard and has a multiplicity of parallel rows of closely spaced discrete cells 42 extending in discontinuous lines axially along the surface of the roll. The rows of cells 42 are separated circumferentially at a distance substantially equal to the distance between the peaks of the flutes of the corrugated medium. The cells 42 are preferably frustums of square pyramids and preferably have a diagonal extending in the direction substantially perpendicular to the rows of cells along the surface of the applicator roll 32. The tendency of the blade 40 to pull resin or curing agent from the cells 42 onto the surface of the roll between the rows of cells is overcome by arranging the cells with a diagonal perpendicular to the direction of the row. The cells 42 are preferably relatively shallow as compared with the diagonal length and have converging side walls 44 that terminate in a bottom surface 46 to form the frustums of square pyramids. A satisfactory cell pattern is one in which there are about 12 cells per linear inch, each cell having a depth of about .024 inch and having a diagonal length on the surface of about .070 inch. Obviously, other cell patterns and dimensions can be used.

When aplicator roll 32 contains spaced cells according to the preferred embodiment of this invention, liquid curing agent (or resin as the case may be) is picked up by the applicator roll 32 as it rotates in pan 36. Blade 40 removes the curing agent from the surface of the roll 32, leaving curing agent within the cells 42. The curing agent is applied to liner 31 in the form of individual droplets, one from each cell, as the liner passes through the nip 33 formed by rolls 32 and 34. The droplets from one row of cells quickly unite to form a substantially continuous line of curing agent across the liner 31 or they will remain separated by a very small distance until they form a continuous line in the nip 18. In either event, the continuous transverse or cross-machine direction lines of curing agent will register with the flute tips of the corrugated medium and contact the continuous lines of resin hereon to effect bonding of the liner to the corrugated medium.

The amount of curing agent transferred to the liner 31 is dependent upon the pressure between rolls 32 and 34.

As pressure increases, more curing agent is transferred from the cells 42 to the liner 31 and as pressure decreases, less curing agent is printed on the liner 31. Suitable pressure means, such as fluid cylinders (not shown), control the pressure between rolls 32 and 34. For best control, roll 34 preferably has a resilient covering. The preferred applicator roll, having parallel rows of spaced cells for printing lines of one of the adhesive constituents on a board material, is referred to as a line printing roll.

Regardless of whether applicator roll 32 is a gravure roll or a line printing roll, it is drivingly connected to pressure roll 16 by helical gears 50, 52, 54, and 56. Gear 50 is attached to and rotates with pressure roll 16. Gear 52 meshes with gear 50 and is held by suitable frame means (not shown), and gear 54 meshes with gear 52 and is also held by suitable frame means (not shown). Gear 56 is carried by and rotates with applicator roll 32 and meshes with gear 54. The helical gears provide the means for exactly registering lines of curing agent or adhesive on the liner 31 with the flute tips of the corrugated medium when the line printing applicator roll is used. Helical gears 50, 52, and 54 are affixed to carrying shafts while gear 56 is adjustably attached to the shaft of applicator roll 32 and is movable along the shaft toward and away from roll 32. Due to the helical nature of the gears, axial movement of the gear 56 rotates the surface of the line printing applicator roll 32 relative to the surface of the pressure roll 16 and also the corrugating roll 12, and thereby shifts the location of the lines of curing agent or resin on the applicator roll 32 and liner 31 relative to the flute tips of the corrugated medium.

The single faced board B produced according to the present invention can be used to wrap and package articles and finds great utility as a packaging material for fragile items such as glassware.

A second liner can be applied to the single faced board produced as above to form double faced board which finds great utility in the container field. The single faced paperboard B, produced in accordance with FIG. 1 where applicator roll 32 is either a gravure or the preferred line printing roll, is led to a double backer where the second liner is combined with the single faced board. The double backer, according to the preferred embodiment of the invention illustrated in FIG. 4, comprises two application stations as did the single facer described above. Glue pan 62 contains a continuous supply of a first corrugating adhesive constituent, such as a resin material 64, in liquid form. Glue roll 66, a smooth-surfaced or gravure roll, rotates in glue pan 62 and picks up the resin material. Doctor roll 68 meters excess resin from the glue roll 66 and the excess is removed from doctor roll 68 by blade 70. The resinous material remaining on the glue roll 66 is transferred to the peaks of the flutes of corrugated medium of the single faced board B in a continuous line along the length of each of the flute peaks. At a second application station, a second component for the corrugating adhesive, such as a curing agent, is applied to a second liner 71 as it passes through the nip formed by a gravure applicator roll 72 and backing roll 74. Applicator roll 72 rotates in supply pan 76 which contains a continuous supply of the curing agent 78 in liquid form. Excess curing agent picked up by roll 72 is metered from the roll by blade 80. Curing agent 78 on the roll 72 is transferred to liner 71 as a continuous film on the liner which then passes partially around roll 74 and is then led over hot plate section 84. Compression belt 82, having an active run partially around pulley roll 86, presses liner 71 against the single faced board B. The curing agent on liner 71 contacts and reacts with the resin on the flute tips of the corrugated medium 11 to set the resin and bond the liner to the single faced board B as the board materials pass over the hot plate section 84 which is usually heated to between 320 and 360° F. The resulting board, comprising corrugated medium 11, liner 31, and liner 71, is known as double faced board.

As stated previously, the resin can be applied by applicator roll 72 to the liner 71 and the curing agent applied by glue roll 66 to the flute tips of the corrugated medium, as an alternative to the separate applications described above for making double faced paperboard.

To illustrate the separate applications of an adhesive base material and a curing agent therefor, the following examples are set forth.

EXAMPLE 1

In this example, a novel approach to the achievement of waterproof bonds for corrugated paperboard materials is described.

The first adhesive component or adhesive base material was a water dispersion of urea-formaldehyde resin (Borden Casco C5H). The solids content of the aqueous dispersion was about 65% and the pH was approximately 7.0. The second component of the adhesive was a catalyst or curing agent for the urea-formaldehyde resin, and in this instance was a 3% solution of hydrochloric acid thickened to a viscosity of about 150 centipoises by the addition of about one-half percent by weight of a hydroxyethyl cellulose. In operation, at a speed of about 400 feet per minute, glue roll 26 applied the urea-formaldehyde adhesive component to the peaks of the flutes of the corrugated medium in a substantially continuous line along the length of the peak of each flute. Gravure roll 32, having a surface with 16 cells per linear inch, applied the catalyst to liner 31 as a continuous film thereon. The liner was 62 pound wet strength board and the medium was 33 pound wet strength medium. When the liner and medium were combined in nip 18, the bond therebetween was instantaneous. More importantly, the waterproof properties of the bond were excellent, giving fiber tearing bonds after two weeks cold water immersion of the single faced board.

Other runs have indicated good quality bonds between the liner and medium with acid concentrations varying from about 1.5 to 3.0%. Further, gravure rolls with varying cell patterns have been used, and patterns with more or less than 16 cells per linear inch may be used.

EXAMPLE 2

The first adhesive component was an aqueous dispersion comprising, with parts by weight, 100 parts urea-formaldehyde resin (Borden Casco 721/6, 50% solids in water), and 7 parts pearl starch. This first adhesive component, having a pH of about 7.0, was supplied to glue pan 22. The second component of the adhesive was a solution of hydrochloric acid having an acid concentration of about 1.5%. In operation, at a speed of about 475 feet per minute, glue roll 26 applied the urea-formaldehyde adhesive component formulation to the peaks of the flutes of the corrugated medium, and gravure roll 32 applied the catalyst to liner 31 as a continuous film. When the liner and medium were combined, the bond therebetween was instantaneous. Once again, the waterproof properties of the bonds were excellent.

Similar runs have been made without the presence of the uncooked starch and good quality bonds have been formed. However, the presence of a small amount of starch brings about a totally unexpected increase in dry bond quality. This increase is particularly surprising since the starch does not gelatinize during the bonding process described herein. In actual practice of the present invention, up to 28% starch based on the weight of resin has been used with no apparent loss in waterproof properties, but the preferred starch content is about 7%. It is to be noted that the first adhesive component of resin and starch set forth in Example 1 is a typical of known waterproof starch-resin corrugating adhesives in which starch is the major ingredient proportionally.

EXAMPLE 3

Example 1 was repeated except that gravure roll 32 was replaced by a line printing roll as described above, having 12 discrete cells per linear inch. In this instance, the acidic catalyst was line printed on the liner 13 in cross-machine direction lines which registered with the flute tips of the corrugated medium. The lines contained droplets of catalyst which quickly united to form continuous lines across the liner 31. The lines of catalyst on the liner were spaced apart in the machine direction and precisely registered with the peaks of the flutes of the corrugated medium. When combined, the lines of catalyst contacted the resin on the flute tips, and the liner and medium were instantaneously bonded. As before, the bonds were waterproof.

EXAMPLE 4

The resin used in this example was a blend of 30 parts polyvinyl chloride copolymer dispersion, (National 2507), 20 parts polyvinyl alcohol solution (8% Elvanol 72/60), 10 parts of 50% polyethylene imine, and 30 parts water, all parts by weight. The aqueous resin blend was applied by glue roll 26 to the flute tips of the medium. As catalyst, a 7% solution of glyoxal was applied in transverse lines to liner 31 by a line printing applicator roll 32. The bond between the liner and medium was instantaneous when they were combined in nip 18.

EXAMPLE 5

Example 4 was repeated, except that the polyvinyl chloride copolymer dispersion was omitted from the resin blend, and the parts by weight of polyvinyl alcohol, polyethylene imine, and water were 60, 20, and 20 respectively. The resin blend was again cured with a 7% solution of glyoxal which had been transversely line printed on liner 31. The bonds between the liner and medium were formed instantaneously.

EXAMPLE 6

Example 5 was repeated except that the polyvinyl alcohol was omitted. The polyethylene imine was applied to the flute tips of the medium and glyoxal was line printed transversely on the liner by use of a line printing applicator roll. The lines of glyoxal on the liner registered with the polyethylene imine on the flute tips when the liner and medium were combined, and the bond therebetween was instantaneous.

EXAMPLE 7

In this run, polyvinyl alcohol was applied to the flute tips of the corrugated medium and a 3% solution of borax, suitably thickened with starch, was line printed in cross-machine direction lines across the liner. When the liner and medium were combined, the borax instantaneously gelled the polyvinyl alcohol and effected bonding of the liner to the medium.

EXAMPLE 8

As stated hereinbefore, the adhesive base material can be applied to the liner and the curing agent to the corrugated medium.

In this run, an aqueous dispersion of resorcinol-formaldehyde resin (Borden AL6000) of solids content of about 60%, containing sufficient alkali to adjust the pH to about 9.5, was supplied to pan 36. The resin was line printed transversely on liner 31 with the line printing applicator roll. Curing agent, a 37% formaldehyde solution suitably thickenend to about 500 centipoises, was supplied to pan 22 and applied to the flute tips of the corrugated medium by glue roll 26. When the liner and medium were combined in nip 18, the curing agent and lines of resin contacted and reacted to bond the liner to the medium instantaneously. The bonds had excellent water-resistant properties.

EXAMPLE 9

Figure 4:
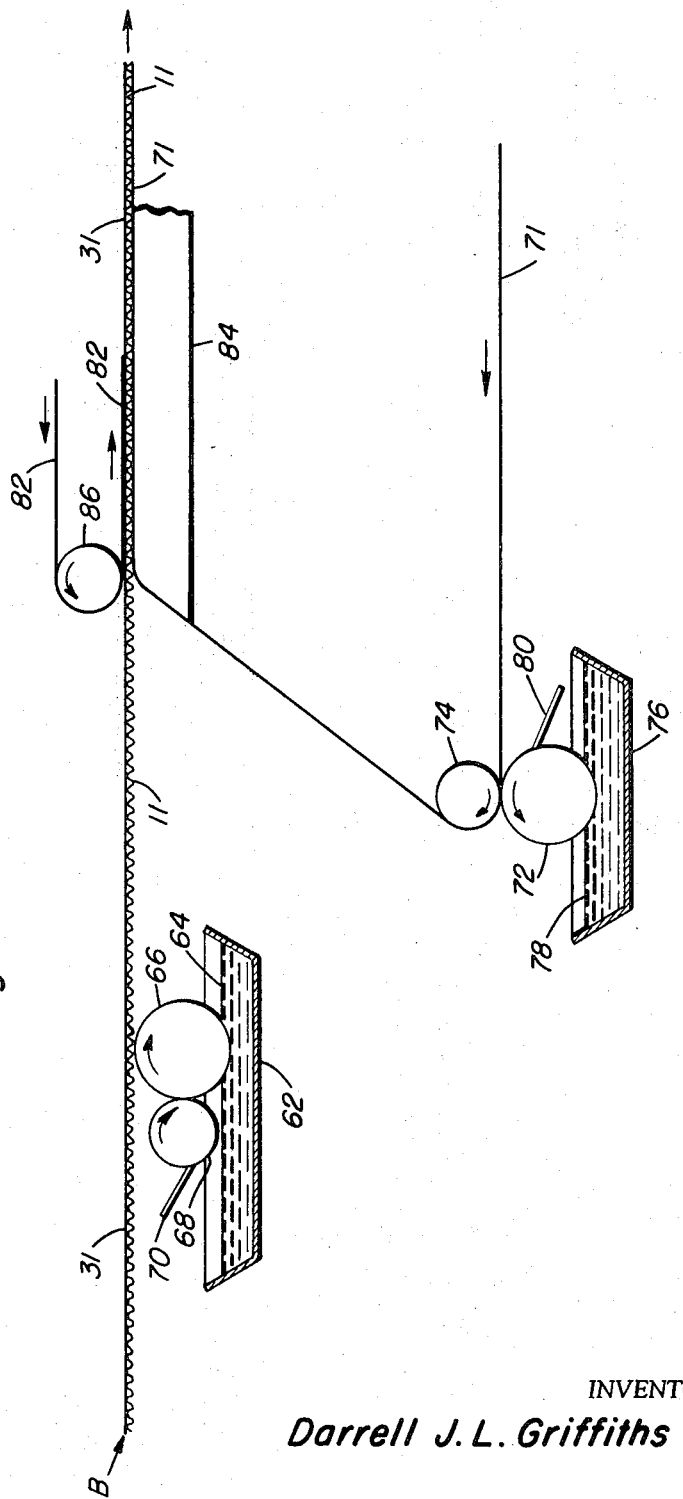
FIG. 4 is a schematic elevational view of a double backer machine which can be used to practice the present invention.

Single faced board made according to Example 3 was led in known manner from the single facer to a double backer as shown in FIG. 4. An aqueous dispersion of urea-formaldehyde resin, solids content of about 65%, was supplied to pan 62. Glue roll 66, a gravure roll having 16 cells per linear inch, applied the resin to the peaks of the flutes of the corrugated medium in a continuous line along the length of the peak of each flute. A 3% solution of hydrochloric acid, suitably thickened to about 150 centipoises, was supplied to pan 76. Gravure roll 72, also having a surface with 16 cells per linear inch, applied the acid solution to liner 71 as a continuous film. The liner 71 was pressed against the flute tips of the corrugated medium 11 by compression belt 82, and the resin and catalyst contacted and reacted to bond the liner 71 to the single faced board B as the board materials passed over hot plate section 84 which was heated to about 350° F. The double faced board thus produced had excellent waterproof properties and was suitable for use in the manufacture of rigid when wet corrugated paperboard containers.

To those skilled in the art, it will be apparent that both liners 31 and 71 and the corrugated medium 11 can be treated with a moisture-proof penetrant, such as wax, in known manner either before, during, or after the corrugating operation to provide moisture-resistant paperboard.

Many other resin-catalyst systems have been tried according to the separate application technique of the present invention. Obviously, any resin and curing agent system, in which the resin and curing agent can be separately applied and then combined to form a suitable corrugating adhesive, can be utilized according to the teachings herein. For instance, melamine resins can be used. While such resins are known to gel or cure on exposure to high temperatures, the process is greatly accelerated by the addition of an acidic catalyst. Further, melamine can also be used according to the present invention as a fortifying agent for the urea-formaldehyde resins employed. Other resins, such as epoxy resins which react with liquid polyamine hardeners like diethylenetriamine and triethylenetetraamine to give rapid gelation, can be used according to the principles of this invention. Phenolic resins are yet another example of resins which can be used in the present invention along with a curing agent such as sufficient sulfonic acid to depress the pH of the system below 3 for a suitable cure.

As can be seen and readily appreciated, the invention is not limited to the use of any particular adhesive formulation. However, the urea-formaldehyde resin-acid curing agent system is the preferred resin-curing agent corrugating adhesive since bonds having excellent waterproof properties are obtained at relatively low cost. Corrugated paperboard manufactured in this manner has the much desired rigid when wet properties long sought by the corrugating industry.

While certain preferred embodiments of the invention have been illustrated and described in detail, it is to be understood that changes may be made therein and the invention practiced in other forms. It is not, therefore, my intention to limit the patent to the specific details described but to cover the invention broadly in whatever form its principles may be utilized.

I claim:

1. The continuous method of making single faced corrugated paperboard which comprises the steps of corrugating a continuously advancing web of paperboard, applying an aqueous dispersion of an instantly settable resin to the peaks of the flutes on one side of the corrugated paperboard, separately applying to a continuously advancing liner a curing agent suitable for instantaneously setting the resin upon contact therewith, combining the corrugated web with the liner to thereby contact the resin-coated peaks of the flutes of the corrugated paperboard web with the curing agent on the liner, and substantially setting the resin instantaneously to form a bond between the flute peaks and the liner.

2. The method of claim 1 in which the curing agent is applied to the liner in rows of droplets which extend transversely across the liner and which rows are spaced from each other at a distance substantially equal to the distance between the peaks of adjacent flutes of the corrugated paperboard.

3. The method of claim 1 in which the resin comprises urea-formaldehyde and the curing agent is an acidic curing agent for urea-formaldehyde resins.

4. The continuous method of making single faced corrugated paperboard having improved waterproof properties which comprises the steps of corrugating a continuously advancing web of paperboard, applying to the peaks of the flutes on one side of the corrugated paperboard an aqueous dispersion of an adhesive component which comprises urea-formaldehyde resin, separately applying to a continuously advancing liner rows of droplets of an aqueous solution of an acidic curing agent for urea-formaldehyde resins, said rows of droplets defining substantially continuous lines of curing agent transversely across the liner spaced apart at a distance substantially equal to the distance between the peaks of adjacent flutes of the corrugated paperboard, combining the corrugated paperboard web and the liner to thereby contact each row of acidic curing agent on the liner with the coated peaks of the flutes of the corrugated paperboard, and substantially setting instantaneously the urea-formaldehyde resin in the adhesive component to bond the liner to the corrugated paperboard.

5. The method of claim 4 in which the urea-formaldehyde resin is present in the adhesive component as the major ingredient by weight, and the adhesive component further comprises uncooked starch as a minor ingredient by weight.

6. The continuous method of making double faced corrugated paperboard comprising the steps of corrugating a continuously advancing web of paperboard, applying to the peaks of the flutes on a first side of the corrugated paperboard an aqueous dispersion of an adhesive component which comprises urea-formaldehyde resin, separately applying to a continuously advancing first liner rows of droplets of an aqueous dispersion of an acidic curing agent for urea-formaldehyde resins, said rows of droplets defining substantially continuous lines of curing agent transversely across the first liner and spaced apart at a distance substantially equal to the distance between the peaks of adjacent flutes of the corrugated paperboard, combining the corrugated web with the first liner and thereby contacting each row of acidic curing agent on the first liner with the coated peaks of the flutes of the corrugated paperboard, to react the resin and curing agent and bond the first liner to said first side of the corrugated paperboard, continuously advancing the bonded corrugated web and first liner, applying to the peaks of the flutes on a second side of the corrugated paperboard an aqueous dispersion of an adhesive component which comprises urea-formaldehyde resin, separately applying to a continuously advancing second liner an aqueous dispersion of an acidic curing agent for urea-formaldehyde resins, combining the second liner with the second side of the corrugated web and thereby contacting the coated peaks of the flutes on said second side of the corrugated paperboard with the acidic curing agent on said second liner, to react the resin and curing agent and bond the second liner to the second side of the corrugated paperboard, thereby forming double faced corrugated paperboard.

7. The method of claim 6 which includes the additional step of heating the double faced corrugated paperboard after the resin on the flute peaks on the second side of the corrugated paperboard and the curing agent on the second liner have been brought into reactive contact with each other.

8. The continuous method of forming double faced corrugated paperboard comprising the steps of applying a substantially continuous line of an instantly settable resin in liquid form to the peak of each flute on a first side of a continuously advancing corrugated medium, separately applying to a continuously advancing first liner a curing agent in liquid form which is instantaneously reactive with said resin to form a first corrugating adhesive, then combining the corrugated medium with the first liner to thereby contact and react the resin on the peaks of the flutes of the corrugated medium with the curing agent on the liner and adhesively bond the first liner to the peaks of the flutes on said first side of the corrugated medium, continuously advancing the bonded corrugated medium and first liner, applying a substantially continuous line of an instantly settable resin in liquid form to the peak of each flute on a second side of the corrugated medium, separately applying to a continuously advancing second liner a curing agent in liquid form which is instantaneously reactive with said resin on said second side of the corrugated medium to form a second corrugating adhesive, then combining the second liner with the second side of the corrugated medium to thereby contact and react the resin on the peaks of the flutes on said second side of the corrugated medium with the curing agent on the second liner and adhesively bond the second liner to the peaks of the flutes on said second side of the corrugated medium.

9. The method of claim 8 in which the curing agent of the first corrugating adhesive is applied to the first liner as a continuous film, and the curing agent of the second corrugating adhesive is applied to the second liner as a continuous film.

10. The method of claim 8 in which the curing agent of the first corrugating adhesive is applied to the first liner in rows of spaced droplets which define substantially continuous lines of curing agent transversely across the first liner, and the curing agent of the second corrugating adhesive is applied to the second liner as a continuous film.

11. The method of claim 10 in which the lines of curing agent on the first liner are spaced apart at a distance substantially equal to the distance between the peaks of adjacent flutes of the corrugated medium.

12. The method of claim 8 in which the resin comprises urea-formaldehyde and the curing agent is an acidic curing agent for urea-formaldehyde resins.

13. The continuous method of forming double faced corrugated paperboard comprising the steps of applying to a continuously advancing first liner an instantly settable resin in liquid form, separately applying to the peak of each flute on a first side of a continuously advancing corrugated medium a substantially continuous line of a curing agent in liquid form which is instantaneously reactive with said resin to form a first corrugating adhesive, then combining the corrugated medium with the first liner to thereby contact and react the curing agent on the peaks of the flutes of the corrugated medium with the resin on the liner and adhesively bond the first liner to the peaks of the flutes on said first side of the corrugated medium, continuously advancing the bonded corrugated medium and first liner, applying to a continuously advancing second liner an instantly settable resin in liquid form, separately applying to the peak of each flute on a second side of the corrugated medium a substantially continuous line of a curing agent in liquid form which is instantaneously reactive with said resin on said second liner to form a second corrugating adhesive, then combining the second liner with the second side of the corrugated medium to thereby contact and react the curing agent on the peaks of the flutes on said second side of the corrugated medium with the resin on the second liner and adhesively bond the second liner to the peaks of the flutes on said second side of the corrugated medium.

14. The continuous method of making single faced corrugated paperboard which comprises the steps of corrugating a continuously advancing first web of paperboard, applying to a continuously advancing second web of paperboard and aqueous dispersion of an instantly settable resin, separately applying to the peaks of the flutes on one side of said corrugated paperboard web a curing agent suitable for instantaneously setting the resin on the second paperboard web upon contact therewith, combining the corrugated web with the second paperboard web to thereby contact the resin-coated second paperboard web with the curing agent on the peaks of the flutes of the corrugated paperboard web, and substantially setting the resin instantaneously to form a bond between the flute peaks and the liner.

References Cited

UNITED STATES PATENTS

| 2,463,148 | 3/1949 | Caesar et al. | 156—210 |
| 2,537,343 | 1/1951 | Golick et al. | 156—310 X |
| 3,256,126 | 6/1966 | Balhofen | 156—210 |
| 3,300,359 | 1/1967 | Nikkel | 156—292 |

SAMUEL W. ENGLE, Primary Examiner

U.S. Cl. X.R.

156—210, 310, 314, 470